United States Patent [19]
Okazoe et al.

[11] Patent Number: 5,641,460
[45] Date of Patent: Jun. 24, 1997

[54] GAS-LIQUID CONTACTOR AND WET FLUE-GAS DESULFURIZATION SYSTEM

[75] Inventors: Kiyoshi Okazoe; Yoshio Nakayama; Yoichi Shiga, all of Tokyo; Masakazu Onizuka, Hiroshima, all of Japan

[73] Assignee: Mitsubishi Jukogyo Kabushiki Kaisha, Tokyo, Japan

[21] Appl. No.: 534,866

[22] Filed: Sep. 27, 1995

[30] Foreign Application Priority Data

Nov. 8, 1994 [JP] Japan .................................. 6-273216

[51] Int. Cl.$^6$ .................. B01D 53/34; B01F 3/04
[52] U.S. Cl. .................. 422/171; 422/172; 422/178; 422/224; 422/225; 422/234; 55/228; 55/229; 55/247
[58] Field of Search ..................... 422/168, 169, 422/171, 143, 178, 172, 224, 231, 225, 227, 234; 55/228, 229, 247, 255; 95/187, 195; 423/248.03, 243.08

[56] References Cited

U.S. PATENT DOCUMENTS

| | | | |
|---|---|---|---|
| 2,584,391 | 2/1952 | Leffer | 422/143 |
| 4,374,812 | 2/1983 | Atsukawa et al. | 423/243.08 |
| 4,431,608 | 2/1984 | Katagiri | 55/228 |
| 4,515,754 | 5/1985 | Stehning | 55/228 |
| 4,587,112 | 5/1986 | Kim | 423/243.03 |
| 5,106,603 | 4/1992 | McCord et al. | 423/243.01 |
| 5,132,027 | 7/1992 | Ukawa et al. | 423/243.08 |
| 5,160,707 | 11/1992 | Murray et al. | 55/229 |

FOREIGN PATENT DOCUMENTS

0246180A3  5/1987  European Pat. Off. .
0369876A1  11/1989  European Pat. Off. .

*Primary Examiner*—Robert J. Warden
*Assistant Examiner*—Hien Tran
*Attorney, Agent, or Firm*—Jacobson, Price, Holman & Stern, PLLC

[57] ABSTRACT

This invention relates to a gas-liquid contacting device for efficiently bringing a gas into contact with a slurry solution, and a wet flue-gas desulfurization system using the contacting device. The contacting device incorporated in the system comprises a tank to be supplied with a slurry solution, a set of agitator bars held above the bottom of the tank to be horizontally rotatable, a plurality of gas supply pipes for supplying a gas to the vicinity of the agitator bars, nozzles directed to the region through which the agitator bars rotate or to its vicinity, and a plurality of liquid supply pipes for supplying a liquid to the nozzles.

3 Claims, 3 Drawing Sheets

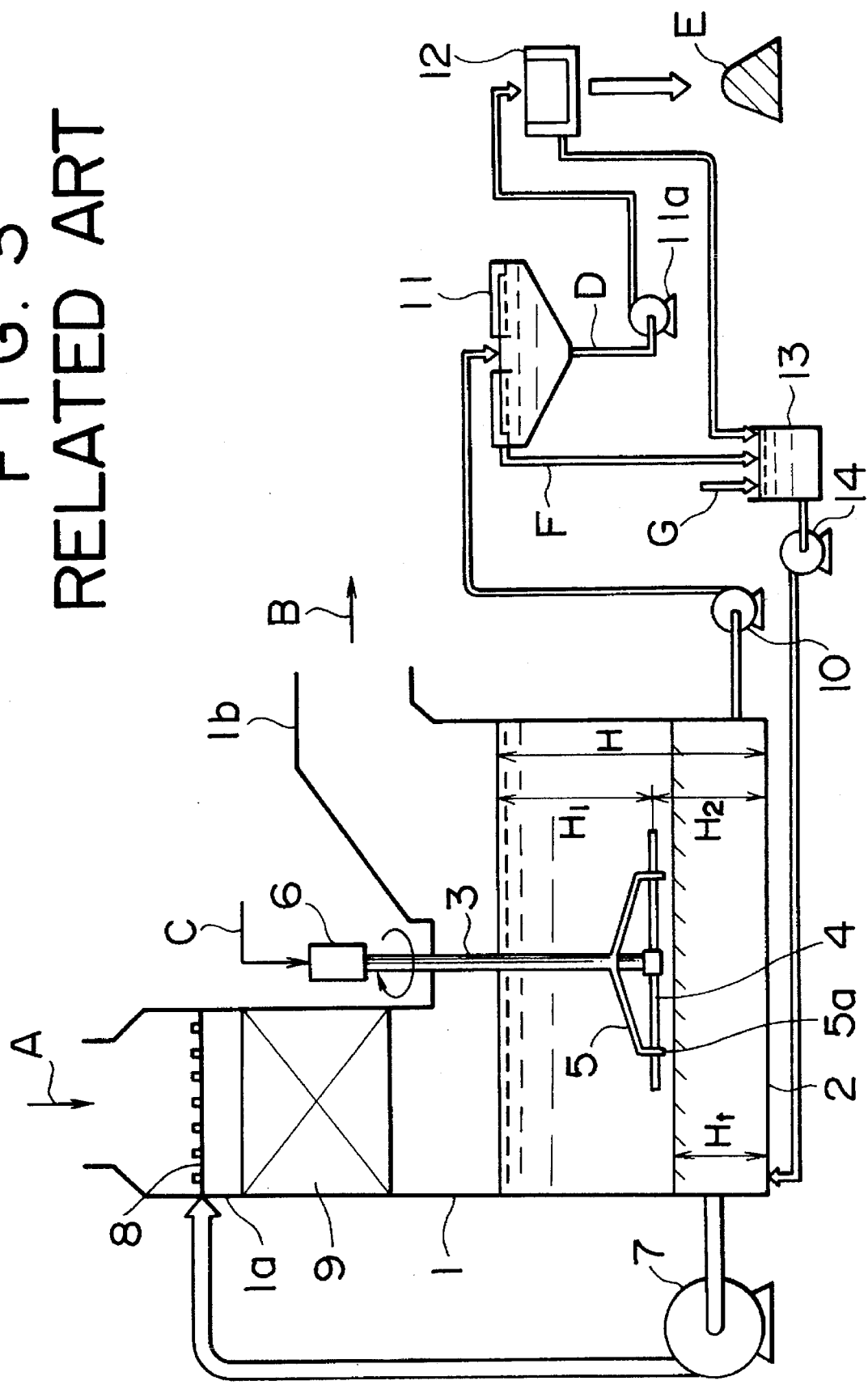

GAS-LIQUID CONTACTOR AND WET FLUE-GAS DESULFURIZATION SYSTEM

BACKGROUND OF THE INVENTION

1. Field of the Invention

This invention relates to a gas-liquid contacting device for efficiently bringing a gas into contact with a slurry solution and also relates to a wet flue-gas desulfurization system using the contacting device.

2. Description of the Related Art

Among recent systems for wet flue-gas desulfurization, the in-situ oxidation system has come to be dominant. That type is so called because air is introduced into a tank of an absorption tower where it is contacted with a slurry solution (of a calcium compound such as limestone) that has absorbed sulfur dioxide from flue gas and carries out oxidation, dispensing with an oxidation tower. With a system of the type, how efficiently the air and the slurry solution are brought into contact is a key to the saving of air and power consumption, speedup of the treatment, reduction of the tank size, and other improvements. The means for supplying air to the tank for contact with the slurry solution, that is, a gas-liquid contacting device, comprises a mere array of air supply pipes mounted in the tank to effect bubbling. The means is not fully satisfactory in performance compared with oxidation tower of the pressure type and the like. With this in view, the present applicant has more recently developed and put into use a gas-liquid contacting device of a so-called arm rotating type, wherein air is supplied behind agitation bars turning inside a tank, and also a wet flue-gas desulfurization system using the contacting device.

FIG. 3 schematically shows the arrangement of a wet lime-gypsum desulfurization system incorporating the arm rotating type gas-liquid contacting device. The contacting device comprises agitator bars 4 suspended by a hollow rotating shaft 3 in a tank 2 of an absorption tower 1 so as to be driven for horizontal turning by a motor not shown, air supply pipes 5 branched from hollow rotating shaft 3, with open ends 5a extended beneath agitator bars 4, and a rotary joint 6 connecting the upper end of hollow rotating shaft 3 to an air source not shown. Hollow rotating shaft 3 is caused to run while air is being forced into the hollow shaft, whereby air C is supplied to gas phase regions being formed behind turning agitator bars 4. The vortical forces that result from the rotation of agitator bars 4 shred the trailing end portions of the gas phase regions, thus producing numerous fine bubbles substantially uniform in size. This phenomenon promotes efficient contact between air and the absorbent slurry solution that has absorbed sulfur dioxide in tank 2, until the slurry is totally oxidized and gypsum as a by-product is obtained.

In the system shown, untreated flue gas A is led into a flue gas inlet 1a of absorption tower 1, brought into contact with an absorbent slurry solution being sprayed from a header pipe 8 by a recirculation pump 7, freed from sulfur dioxide, and then is discharged as treated flue gas B from a flue gas outlet 1b. The absorbent slurry solution that has been sprayed from header pipe 8 flows down while absorbing sulfur dioxide from the flue gas, via a packing section 9, into tank 2. Inside the tank the slurry solution is stirred by agitator bars 4, oxidized by contact with the countless bubbles that have stemmed from the shredding phenomenon, and then converted into gypsum by a neutralization reaction. Principal reactions that take place during this treatment are expressed by the following reaction formulas (1) to (3).

(In absorption tower)
$$SO_2 + H_2O \longrightarrow H^+ + HSO_3^- \tag{1}$$

(In tank)
$$H^+ + HSO_3^- + 1/2 O_2 \longrightarrow 2H^+ + SO_4^{2-} \tag{2}$$

$$2H^+ + SO_4^{2-} + CaCO_3 + H_2O \longrightarrow CaSO_4 \cdot 2H_2O + CO_2 \tag{3}$$

Thus, inside the tank 2, gypsum and a small amount of limestone as the absorbent are suspended. They are drawn out of the tank by a slurry pump 10 and led to a thickener 11, and a resulting concentrated solution D is fed by another slurry pump 11a to a solid-liquid separator 12, where it is filtered and a cake with a low water content is taken out as gypsum E. Meanwhile a supernatant fluid F from thickener 11 and the filter drain from solid-liquid separator 12 are both sent to a filtrate tank 13, where limestone G is added and the mixture as an absorbent slurry solution is fed back to tank 2 by a slurry pump 14.

To maintain a high desulfurization rate and gypsum purity during operation, the sulfur dioxide concentration in the untreated flue gas A, pH in the tank, and other parameters are monitored by sensors, and on the basis of the monitored information the supply rates of limestone and absorbent slurry solution and the like are suitably adjusted by controls not shown. The open ends 5a of air supply pipes 5 are extended downward, usually about 200 mm beneath the underside of agitator bars 4. The extended end portions allow the splash that may gain entrance into the pipes during operation to flow down, thus preventing scale deposition on the inner walls of air supply pipes 5 during operation for long periods.

In the gas-liquid contacting device of the construction described above, it is necessary that the height $H_2$ of agitator bars 4 from the bottom of tank 2 should be above the height $H_t$ of a deposit of solids in the slurry solution that would settle down in tank 2 upon stoppage of agitator bars 4 or recirculation pump 7 (the latter height being hereinafter called "the slurry deposit height"). Should agitator bars 4 be buried in a deposit of the solids in the case of an emergency stop due to some trouble of the flue gas purification system, they might become unable to restart breaking down the resistance of the deposit. If this possibility were to be precluded by providing an extra power supply to keep agitator bars 4 running in an emergency or by using an enhanced driving torque for the bars 4, the cost would be substantial.

The construction of the prior art gas-liquid contacting device has called for tanks larger than necessary and cumbersome to maintain. The bubbles produced by the shredding phenomenon come in contact with the slurry solution as they ascend from the vicinity of agitator bars 4 to the liquid level. It means that the effective oxidation volume represents the region between the rotating position of agitator bars 4 and the liquid level; the tank bottom portion below agitator bars 4 contributes practically nothing to the gas-liquid contact, or the oxidation reaction. For the maintenance of absorption tower 1, the slurry solution in tank 2 must at times be discharged, with stirring, by the slurry pump. When the liquid level has fallen to the slurry deposit height, agitator bars 4 no longer stir but run idle, and eventually the deposit of solids on the bottom of tank 2 has to be scraped out by human hands.

These problems are looming larger to the art since the recent tendency toward higher sulfur contents in fuels has entailed increasing sulfur dioxide concentrations in flue gases. In order to obtain high purity gypsum from the flue gases by a convenient filtration treatment or the like while keeping a high desulfurization rate, it is necessary for a flue gas desulfurization system to set the solids concentration in tank 2 usually to a high level of about 30% by weight. For example, when the height $H_1$ of the liquid level of a slurry solution as measured from agitator bars 4 is to be set to about 4 meters so as to secure an effective oxidation volume, the height $H_2$ of agitator bars 4 from the tank bottom must be about 2 meters, or well above the slurry deposit height $H_r$ ($H_r$=0.3×H, or about 1.8 meters in this case), which add up to the liquid level height H of about 6 meters, necessitating a sufficiently deep and large tank 2 to accommodate them all. When the slurry solution must be discharged for the maintenance of the system, the depth of about 2 meters cannot be stirred and the bottom solids layer at least 0.6 meter thick must be manually scraped out. The tank being as large as about 10 meters in diameter, it is plain hard labor, adding much to the costs and time of maintenance.

SUMMARY OF THE INVENTION

The present invention has for its object to provide a gas-liquid contacting device including agitator bars which, even when covered with a deposit of solids on the bottom of a tank, can be started by partially driving off the deposit, and a wet flue-gas desulfurization system incorporating the gas-liquid contacting device.

To realize the object, the gas-liquid contacting device according to the invention, comprises a tank to be supplied with a slurry solution, a set of agitator bars held above the bottom of the tank to be rotatable horizontally, a plurality of gas supply pipes for supplying a gas to the vicinity of the agitator bars, a nozzle unit directed to the region through which the agitator bars rotate or to the vicinity thereof, and a plurality of liquid supply pipes for supplying a liquid to the nozzle unit.

The contacting device in an embodiment of the invention has the nozzle unit in the form of a plurality of nozzles mounted along the circular region through which the agitator bars rotate, with their orifices aimed at plural points of the region.

The wet flue-gas desulfurization system according to the present invention is of the in-situ oxidation system comprising an absorption tower, the tank which is provided at the bottom of the absorption tower and which is supplied with an absorbent slurry solution of a calcium compound, a recirculation pump for pumping the absorbent slurry solution from the tank into a flue gas inlet in the upper part of the absorption tower to bring it into contact with the flue gas, a set of agitator bars held in the bottom portion of the tank so as to be rotatable horizontally, a plurality of air supply pipes for supplying air for oxidation use to the vicinity of the agitator bars, a nozzle unit directed to the region through which the agitator bars rotate or to its vicinity, .and a plurality of liquid supply pipes for supplying a liquid to the nozzle unit.

The system in an embodiment of the invention has the nozzle unit in the form of a plurality of nozzles mounted along the circular region through which the agitator bars rotate, with their orifices aimed at a plurality of points of the region.

In another embodiment of the system of the invention, the nozzles and the delivery side of the recirculation pump are connected through the liquid supply pipes, the suction side of the recirculation pump is connected to the tank at a point higher than the slurry deposit height, and control valves are provided to force the solution delivered by the recirculation pump selectively into the flue gas inlet or the liquid supply pipes.

According to the invention, even when the agitator bars have been buried in the solids deposited out of the slurry on the tank bottom during a downtime, the bars can be restarted by simply supplying a liquid (e.g., water) under high pressure to the liquid supply pipes and thereby driving off the slurry solids from around the bars. Specifically, the liquid forced into the nozzles through the liquid supply pipes is then sprayed over the region or the vicinity of the region through which the agitator bars rotate, to stir up and remove the deposit of solids from that region to the extent that depends on the spray flow rate and pressure used. The rotational resistance that the agitator bars face is substantially reduced, and the bars can restart without difficulty even when they are driven by a motor simply rated for the torque required for normal operation.

Thus, in addition to the reduced equipment cost, the system presents the following great advantages:

(a) The height of the agitator bars, $H_2$, is decreased to make the tank shallower and smaller in size.

(b) When the tank is to be emptied for maintenance service, the slurry solution can be discharged by a slurry pump while being stirred by the agitator bars until the liquid level falls close to the tank bottom. Consequently, the residual slurry amount is minimized, making it possible to save much man-hours and shorten the time for maintenance work.

Especially when a plurality of nozzles are provided along the circular region through which the agitator bars rotate, with their orifices aimed at plural points of the circular region, the liquid at a small amount of flowing can efficiently cut down the rotational resistance and permit restarting in a short time.

Also, when the nozzles and the delivery side of the recirculation pump in the desulfurization system are connected, the suction side of the recirculation pump is connected to the tank at a point higher than the slurry deposit height, and control valves are provided to force the solution delivered by the recirculation pump selectively into the flue gas inlet or the liquid supply pipes, it is possible by mere switching of the control valves to cause the recirculation pump to spray the supernatant fluid from the tank through the nozzles; provision of an extra pump for restarting the agitator bars is no longer necessary. This adds to the saving of equipment cost.

BRIEF DESCRIPTION OF THE DRAWINGS

FIG. 3 is a schematic illustration of a typical wet flue-gas desulfurization system of the prior art.

DETAILED DESCRIPTION OF PREFERRED EMBODIMENTS

Figure 1:
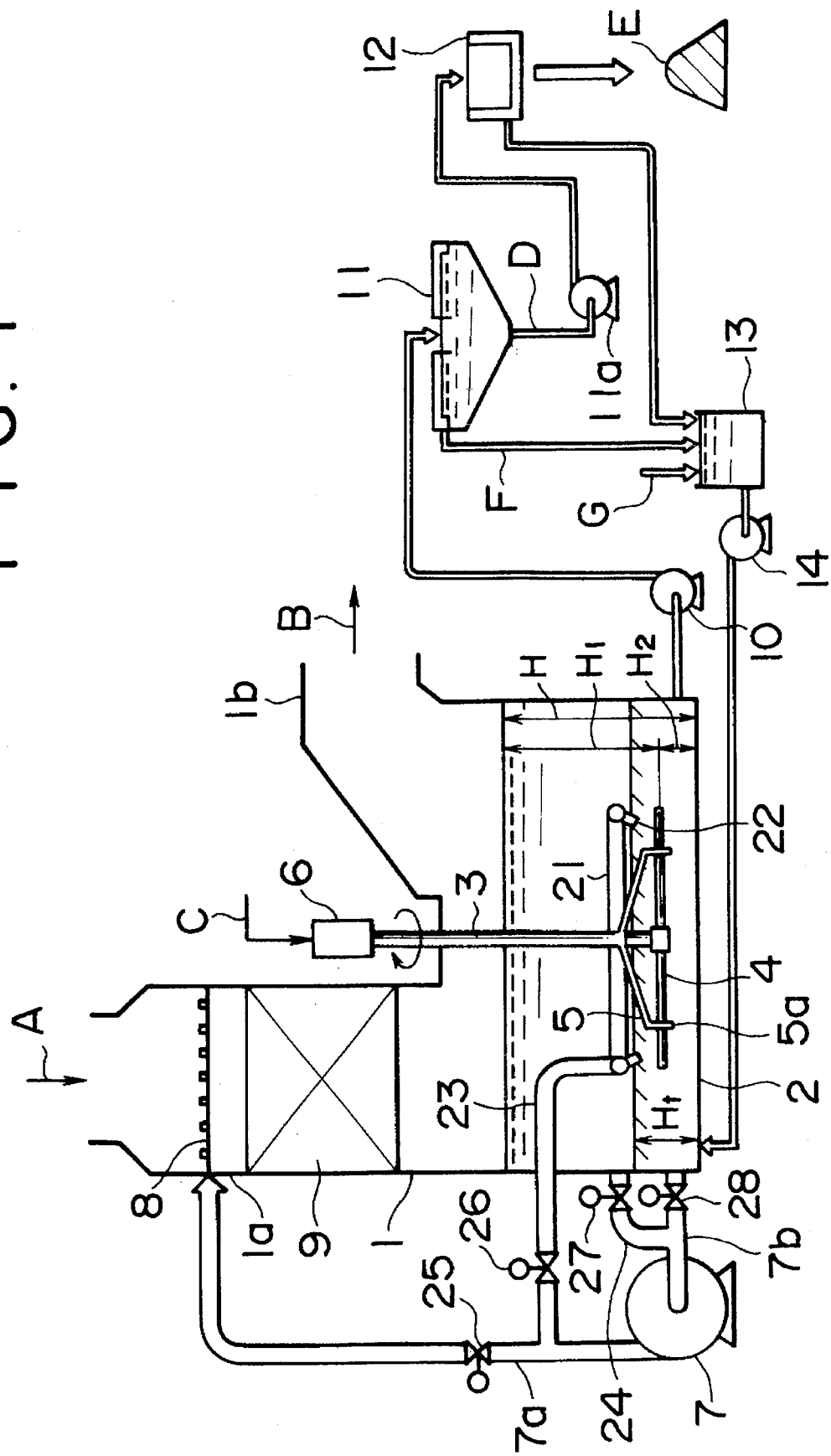
FIG. 1 is a schematic illustration of a wet flue-gas desulfurization system, incorporating a gas-liquid contacting device, as an embodiment of the present invention.
Figure 2:
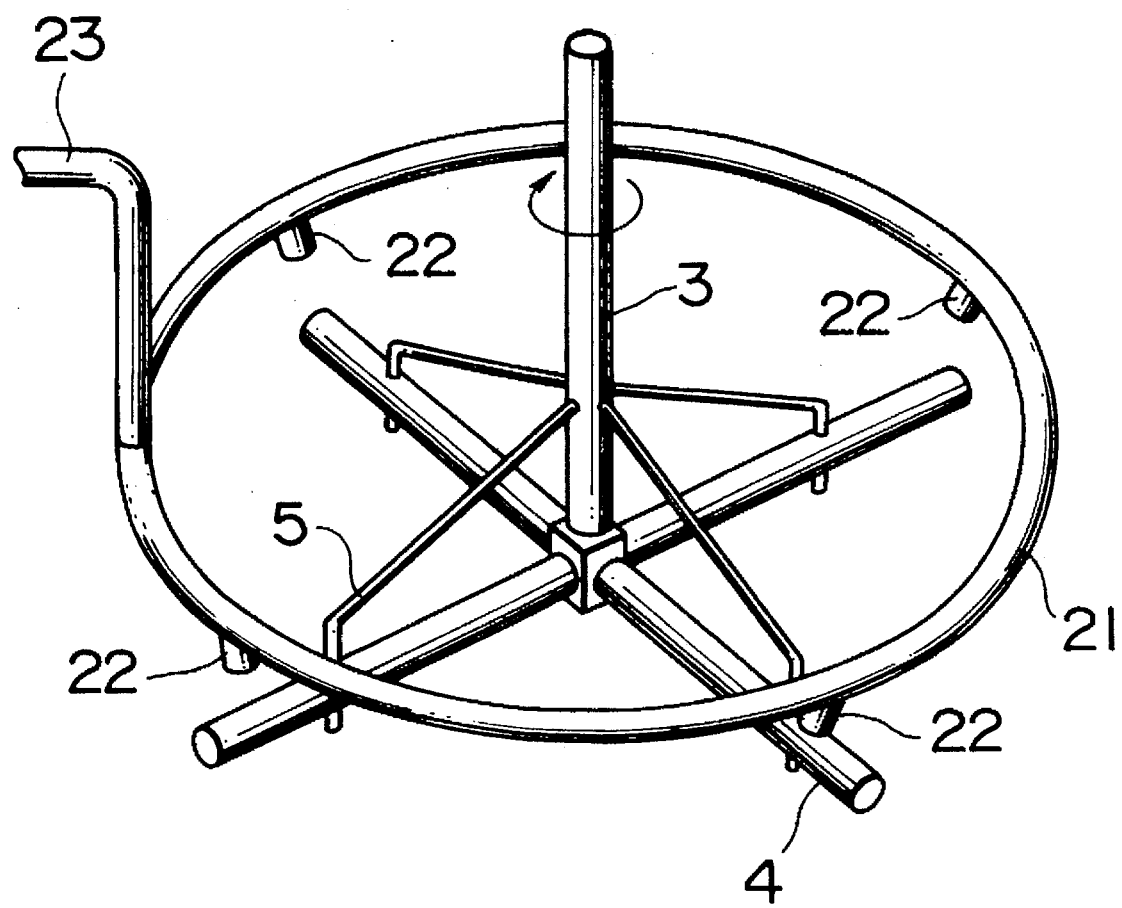
FIG. 2 is a perspective view of an arrangement of agitator bars and associated parts of a wet flue-gas desulfurization system embodying the invention.

The gas-liquid contacting device and wet flue-gas desulfurization system according to the present invention will now be described with reference to FIGS. 1 and 2 showing an embodiment thereof. The parts like those used in the wet flue-gas desulfurization system of the prior art shown in FIG. 3 are designated by like numerals or symbols and the description is omitted. This embodiment of wet flue-gas desulfurization system, as shown in FIG. 1, comprises a circular header pipe 21 held above agitator bars 4 in a tank 2, nozzles 22 protruding downward from circular header pipe 21, a delivery side branch line 23 connecting circular header pipe 21 to the delivery side of a recirculation pump 7, a suction side branch line 24 connecting the suction side of recirculation pump 7 to tank 2 at a level above the slurry deposit height $H_t$, a delivery side main line 7a of recirculation pump 7, and solenoid valves 25, 26, 27, 28, respectively, for the delivery side main line 7a, delivery side branch line 23, suction side main line 7b, and suction side branch line 24. Here the circular header pipe 21 and delivery side branch line 23 serve as liquid supply lines and solenoid valves 25, 26 as control valves in accordance with the present invention.

Circular header pipe 21 is supported, for example, by the inner surrounding wall or bottom of tank 2 with struts or stanchions not shown. As FIG. 2 indicates, it is located concentrically with hollow rotating shaft 3, in parallel with a circular region through which the tips of agitator bars 4 in rotating motion pass. Nozzles 22 protrude downward or upward at angles directed to the circular region from circular header pipe 21, at a plurality of points (four quarter points in the arrangement of FIG. 2). Delivery side branch line 23 is branched out from delivery side main line 7a, extended through the surrounding wall of tank 2, and connected to circular header pipe 21 as shown in FIG. 2.

Solenoid valves 25, 26, 27, 28 are controlled, for example, by a control unit or the like for the whole system. In ordinary operation, solenoid valves 25, 28 are normally kept open and solenoid valve 26 closed. When it is found necessary to remove a deposit of solids from the tank, the solenoid valves are shifted to a restarting state, closing valves 25, 28 and opening valves 26, 27.

The control unit is so programmed that it switches the proper solenoid valves on for restarting and operates the recirculation pump 7 when the desulfurization system is to be restarted after the lapse of a given time of solids deposition in tank 2 following an emergency stop of agitator bars 4 by intentional manipulation or because of some trouble, for example, caused in the desulfurization system. For the restarting, the control unit automatically controls the solenoid valves to the restarting state and operates recirculation pump 7 and, after a preset period of restarted operation, for example, starts the motor that drives agitator bars 4. Then, only when the current value of the motor is below the allowed limit, the solenoid valves are shifted to the normal state to resume the operation of the whole system. When the current value at the start of the motor driving the agitator bars exceeds the allowed limit (i.e., torque overload), the control unit repeats a procedure of stopping and then restarting the motor. When the current value of the motor does not come down after the procedure has been repeated a predetermined number of times, it outputs a signal, indication, or voice telling the inability of restarting.

In the embodiment being described, the height $H_2$ of agitator bars 4 from the bottom of tank 2 is fixed to be smaller than the slurry deposit height $H_t$ so as to lower the liquid level H and reduce the size (depth) of tank 2. For instance, while the height $H_1$ of the liquid level from agitator bars 4 is 4 meters as in the prior art system, the height $H_2$ of agitator bars 4 from the bottom of the tank is about 0.5 meter, thus decreasing the overall height H of the liquid level to only about 4.5 meters. In this case, if the slurry concentration in tank 2 during operation is 30% by weight, it follows that the slurry deposit height $H_t$ is 0.3×4.5 meters, or about 1.35 meters.

The operation of the wet flue-gas desulfurization system constructed as above will now be explained. In ordinary operation, solenoid valves 25, 26, 28 are kept in the normal state, opening delivery side main line 7a and suction side main line 7b while closing delivery side branch line 23. Consequently, recirculation pump 7 functions in the same way as the counterpart of the prior art system shown in FIG. 3. The system operates in the manner described with the prior system, desulfurizing flue gases and secondarily producing gypsum.

When the whole system, once brought to an emergency stop due to some trouble or for any other reason, is restarted after the lapse of time long enough to allow deposition of solids in tank 2, the solenoid valves are automatically switched to the restarting state by the function of the control unit, and recirculation pump 7 is driven. Then, a supernatant fluid is drawn out of tank 2 by recirculation pump 7 through suction side branch line 24, and is sent via delivery side branch line 23 and circular header pipe 21 to nozzles 22 for spraying against the region (the peripheral zone primarily) in which agitator bars 4 turn. Since recirculation pump 7 is a large one, with a rated delivery flow rate of the order of 1000 $m^3/h$ and a rated delivery pressure of 10 meters (head), the spraying is performed at high enough flow rate and pressure to stir up at least the solids of short deposition time. Thus it drives the deposit of solids thoroughly out of the rotating region (especially the peripheral zone) of agitator bars 4. With the resistance of deposited solids to the rotation of agitator bars 4 reduced to almost nil, the whole system can resume the operation with a smooth start of agitator bars 4 under the control of the control unit.

Arrangement of nozzles 22, with their orifices aimed at the rotational path of the front end portions of agitator bars 4, helps remove more of the solids far distant from the rotational center of the bars than the solids closer to the center. In this way the nozzles efficiently decrease the rotational resistance (moment) of the deposited solids.

Even in such a rare case when the spraying with nozzles 22 cannot fully drive off the solids because of hardening due, for example, to prolonged downtime, the control unit functions to repeat the restarting procedure until it finally informs the inability of starting, enabling the operators of the desulfurization system to judge instantly which steps need to be taken. Switching the solenoid valves to the restarting position and driving recirculation pump 7 can be done manually too, by handling the control unit as noted above. In case of failure of automatic control by the unit, therefore, the operators can suitably manipulate so as to cause nozzles 22 to spray the supernatant fluid and effect the restarting.

With the system embodying the invention, as explained above, the height $H_2$ of agitator bars 4 is set below the slurry deposit height $H_t$, and yet the system after an ordinary emergency stop can be restarted without any special work. The only pieces of hardware to be added for that purpose are inexpensive and small devices such as nozzles, pipings, and solenoid valves. Neither additional power supply installation nor a motor of higher capacity for agitator bars 4 is called for. The system, despite the equipment cost thus kept low, offers the following outstanding advantages:

(a) As the height $H_2$ of agitator bars 4 can be as low as about 0.5 meter, the depth of tank 2 and hence the overall height of absorption tower 1 can be strikingly decreased. In the case of the embodiment described above, the liquid level H is about 4.5 meters, or 1.5 meters below the level in the prior art system.

(b) When discharging the slurry solution from the tank for maintenance purpose, the slurry pump can continue discharging while the agitator bars stir the solution until the liquid level falls down nearly to the bottom. This minimizes the residual slurry volume, thereby decreasing the number of man-hours required for maintenance and shortening the duration of work. In the case of the above embodiment, the slurry pump can discharge the slurry solution down to a liquid level of 0.5 meter, and therefore the layer of residual solids is only 0.15 meter thick, or by far smaller than in the conventional tank.

The present invention is not limited to the embodiment described above but may be variously embodied. For example, the layout may dispense with recirculation pump 7 as a pump for supplying a liquid to nozzles; instead, only pipings for supplying liquid to the nozzles may be provided so that the user may suitably connect an external pump to the lines and pump industrial water or the like into the system. The height $H_2$ of agitator bars 4 may be fixed to a value even below 0.5 meter. However, in order to avoid wearing of the lining protective coating layer for the prevention of rusting or other corrosion) on the bottom of tank 2 by the air streams issued from air supply pipes 5, it is desirable that the distance between the open ends 5a of air supply pipes 5 and the bottom Of tank 2 be of the order of 200 mm. When the length of air supply pipes 5 extending beyond agitator bars 4 is 200 mm, the height $H_2$ of the bars is desirably 400 mm or more.

It is to be understood that the gas-liquid contacting device of the invention is not limited in its application to a part of the absorption tower, as described above, of a wet flue-gas desulfurization system of the in-situ oxidation systems, it may of course be applied as well to other fields and other systems that involve a process requiring efficient contact between a slurry solution and a gas.

We claim:

1. A wet flue-gas desulfurization system of the in-situ oxidation system comprising:

an absorption tower having an upper and lower portion;

a tank to be supplied with an absorbent slurry solution of a calcium compound, located at the lower portion of the absorption tower, the tank having a bottom;

a recirculation pump for pumping the absorbent slurry solution from the tank into a flue gas inlet located in the upper portion of the absorption tower to bring the absorbent slurry solution into contact with a flue gas, at least one agitator bar supported above the bottom of the tank, the agitator bar being rotatable through a horizontal plane such that when the agitator bar is rotating a region through which the agitator bar rotates is provided;

at least one air supply pipe for supplying air for oxidation use to a location at least substantially adjacent to the agitator bar; and at least one liquid supply pipe having at least one nozzle directed substantially to a region through which the agitator bar rotates, such that in use when slurry deposits are formed on the agitator bar, the deposits are removed, and slurry deposits are prevented from forming, by supplying a liquid via the at least one liquid supply pipe to the at least one nozzle and spraying the liquid substantially towards the region through which the agitator bar rotates; wherein the liquid supply pipe comprises a circular portion commensurate with the region through which the at least one agitator bar rotates and the at least one nozzle comprises a plurality of nozzles which are mounted at intervals along the circular portion of the supply pipe.

2. The system as claimed in claim 1, wherein the recirculation pump comprises one side which is connected to a delivery line and an other side which is connected to a suction line, wherein the delivery line is further connected to the at least one liquid supply pipe and to the flue gas inlet and the suction line is further connected to the bottom of the tank at a point higher than a height of deposition of a solid component in the absorbent slurry solution, and the system further comprises a plurality of control valves to force the solution being delivered in the delivery line by said recirculating pump either into the flue gas inlet or the liquid supply pipes.

3. A gas-liquid contacting device comprising:

a tank to be supplied with a slurry solution, the tank having a bottom;

at least one agitator bar supported above the bottom of the tank, the agitator bar being rotatable through a horizontal plane such that when the agitator bar is rotating a region through which the agitator bar rotates is provided;

at least one gas supply pipe for supplying a gas to a location at least substantially adjacent to the agitator bar; and at least one liquid supply pipe having at least one nozzle directed substantially towards the region through which the agitator bar rotates such that in use when slurry deposits are formed on the agitator bar the deposits are removed, and slurry deposits are prevented from forming, by supplying a liquid via the liquid supply pipe to the at least one nozzle and spraying the liquid substantially towards the region through which the agitator bar rotates; wherein the liquid supply pipe comprises a circular portion commensurate with the region through which the at least one agitator bar rotates and the at least one nozzle comprises a plurality of nozzles which are mounted at intervals along the circular portion of the supply pipe.

* * * * *